US009798315B2

(12) United States Patent
Rieger et al.

(10) Patent No.: US 9,798,315 B2
(45) Date of Patent: Oct. 24, 2017

(54) MACHINE TOOL POST CONFIGURATOR SYSTEMS AND METHODS

(71) Applicant: Siemens Product Lifecycle Management Software Inc., Plano, TX (US)

(72) Inventors: Roland Rieger, Berlin (DE); Florian Weisse, Berlin (DE); Uwe Roosz, Wendlingen am Neckar (DE); Christian Oetliker, Bern (DE)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 309 days.

(21) Appl. No.: 14/645,130

(22) Filed: Mar. 11, 2015

(65) Prior Publication Data

US 2016/0103438 A1 Apr. 14, 2016

Related U.S. Application Data

(60) Provisional application No. 62/063,712, filed on Oct. 14, 2014.

(51) Int. Cl.
*G05B 19/409* (2006.01)
*G05B 19/4093* (2006.01)

(52) U.S. Cl.
CPC ....... *G05B 19/409* (2013.01); *G05B 19/4093* (2013.01); *Y02P 90/265* (2015.11)

(58) Field of Classification Search
CPC .. G05B 19/409; G05B 19/4093; Y02P 90/265
USPC ...................................................... 700/160
See application file for complete search history.

(56) References Cited

U.S. PATENT DOCUMENTS

| 5,453,933 | A | * | 9/1995 | Wright | G05B 19/414 700/181 |
|---|---|---|---|---|---|
| 6,999,841 | B1 | * | 2/2006 | Rutkowski | G05B 19/408 700/162 |
| 2003/0171841 | A1 | * | 9/2003 | Porter | G05B 19/4097 700/179 |
| 2006/0058909 | A1 | * | 3/2006 | Jesse | G05B 19/401 700/195 |
| 2006/0100934 | A1 | * | 5/2006 | Burr | G06Q 10/06 705/26.81 |
| 2007/0150080 | A1 | | 6/2007 | Hagen | |
| 2007/0191982 | A1 | | 8/2007 | Sullivan | |
| 2007/0250204 | A1 | * | 10/2007 | Ould | G05B 19/401 700/181 |
| 2008/0058982 | A1 | * | 3/2008 | Gray | B25J 9/1602 700/159 |
| 2008/0058984 | A1 | * | 3/2008 | Gray | G05B 19/4069 700/192 |

(Continued)

OTHER PUBLICATIONS

PCT Search Report dated Feb. 23, 2016, for Application No. PCT/US2015/050146, 11 pages.

*Primary Examiner* — Vincent Tran (57) ABSTRACT

Methods for post processor development and corresponding systems and computer-readable mediums. A method includes generating a machine tool post processor having a plurality of levels including a library level, a controller level, and at least one other level. The method includes interacting with a user in a dynamic user interface corresponding to the machine tool post processor. The method includes storing the machine tool post processor.

14 Claims, 7 Drawing Sheets

(56) References Cited

U.S. PATENT DOCUMENTS

| | | | |
|---|---|---|---|
| 2008/0091394 A1* | 4/2008 | Hahn | G05B 19/4069 |
| | | | 703/7 |
| 2008/0161965 A1* | 7/2008 | Haines | G05B 19/409 |
| | | | 700/182 |
| 2010/0063608 A1 | 3/2010 | Miller | |
| 2013/0173031 A1 | 7/2013 | Liang et al. | |

* cited by examiner

MACHINE TOOL POST CONFIGURATOR SYSTEMS AND METHODS

CROSS-REFERENCE TO RELATED APPLICATION

This application claims the benefit of the filing date of U.S. Provisional Patent Application 62/063,712, filed Oct. 14, 2014, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for port processor development and corresponding systems and computer-readable mediums. A method includes generating a machine tool post processor having a plurality of levels including a library level, a controller level, and at least one other level. The method includes interacting with a user in a dynamic user interface corresponding to the machine tool post processor. The method includes storing the machine tool post processor.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Typically, a CAM postprocessor developer creates a new postprocessor from scratch. It can be very difficult to reuse existing functionality from postprocessors developed by other people.

Disclosed embodiments include a library-based model that overcomes this problem. A disclosed postprocessor includes various levels. These levels can be protected against reading and modification, but functions of lower levels can be overridden to implement their own structures. This level concept allows exchanging underlying levels and therefore updating and re-using existing code.

Further, to make adaptions of a postprocessor easier and more comfortable, disclosed embodiments include a dynamic user interface (UI) and flag capability. This allows postprocessor developers and internal software development to make certain functionality of one layer accessible and editable to a higher level.

Through this, software development enables postprocessor developers and authors to select certain types of transformations to be used and the original postprocessor developers and authors can allow the end user to customize the output NC program. This enables postprocessors developers and/or end users to adjust the CAM postprocessor in a very comfortable manner to their needs.

Figure 1:
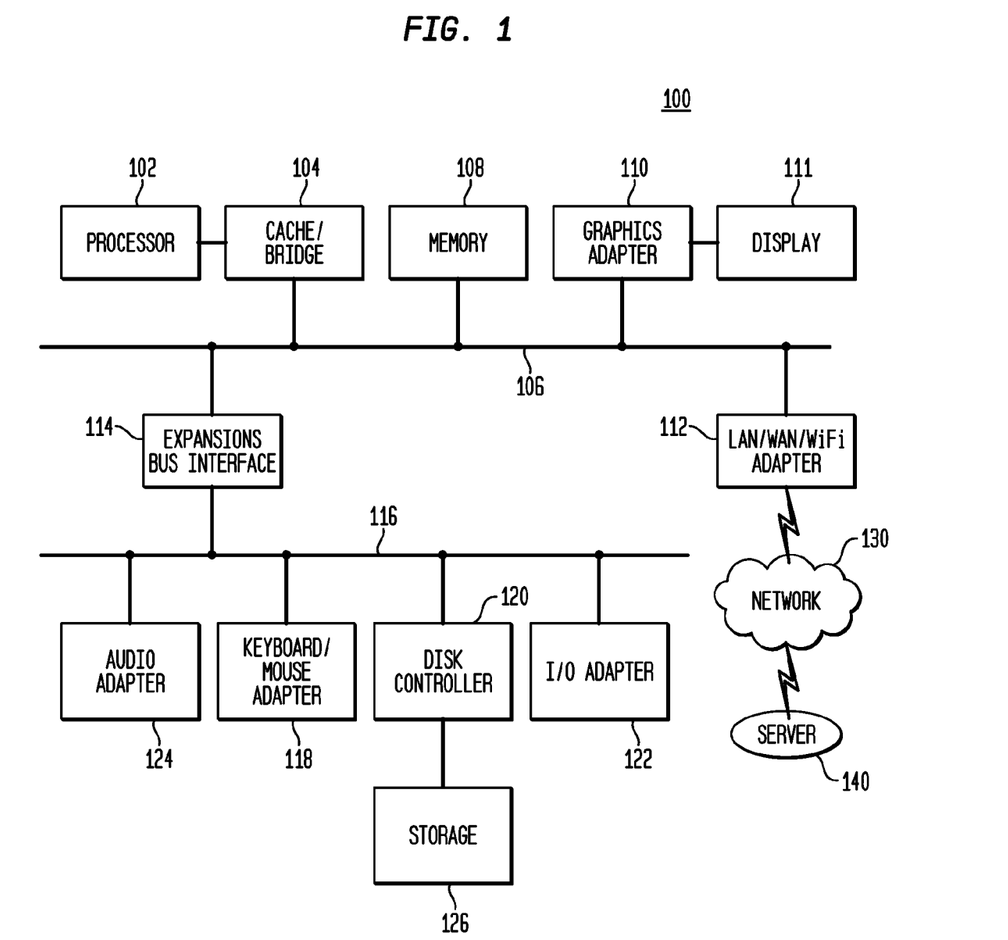
FIG. 1 illustrates a block diagram of a data processing system in which an embodiment can be implemented.

FIG. 1 illustrates a block diagram of a data processing system in which an embodiment can be implemented, for example as a PDM or CAM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
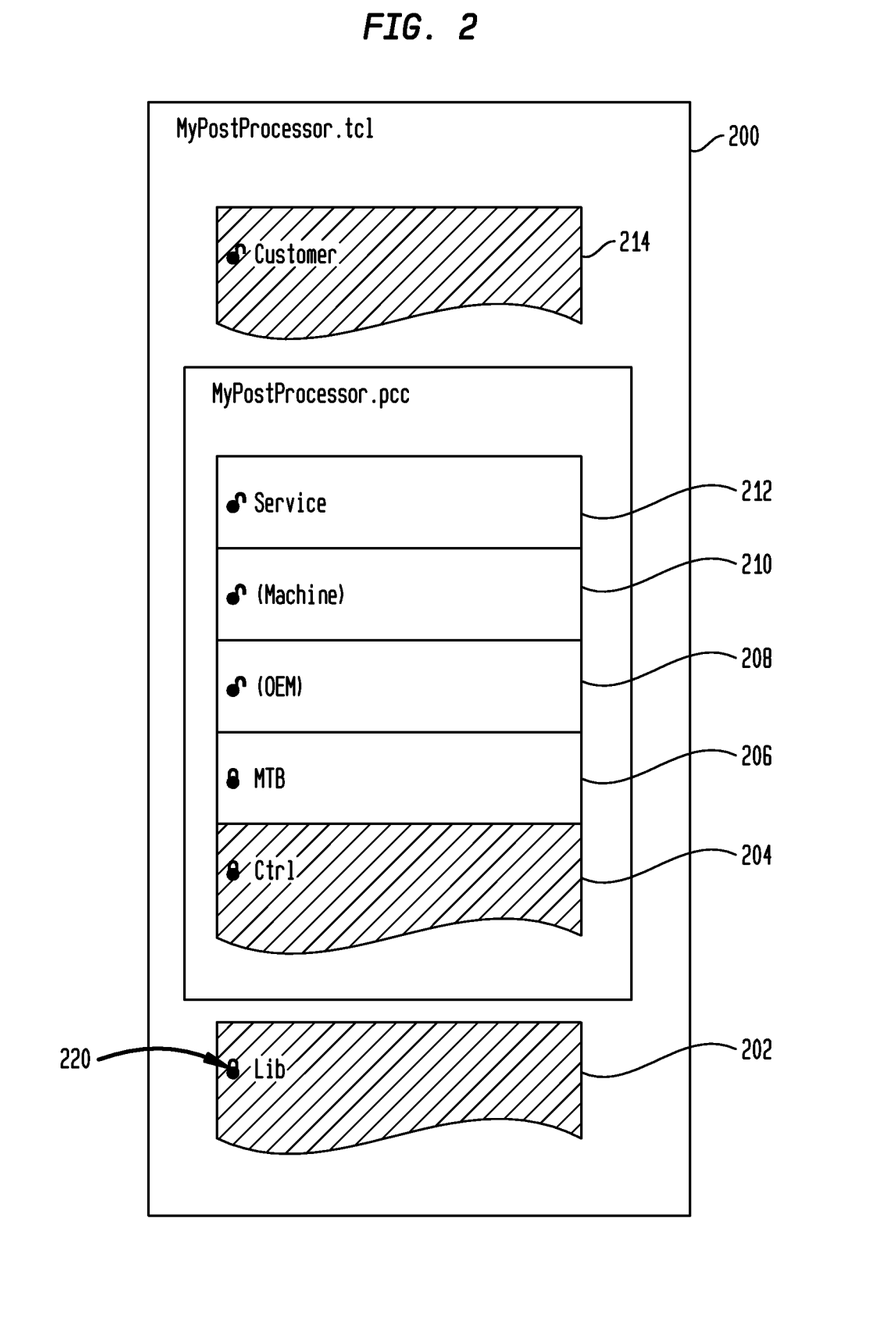
FIG. 2 illustrates a postprocessor in accordance with disclosed embodiments.

FIG. 2 illustrates a postprocessor 200 in accordance with disclosed embodiments.

According to disclosed embodiments, a base level is the "library level" 202, containing basic functionality like file access (I/O functions) or mathematical functions (e.g. transformations) and can be shared across each and every individual postprocessor. Library level 202 can be supplied as a protected level to prevent it from being modified by postprocessor developers, and can be locked as illustrated by lock 220.

On top of the library level is the controller level 204, containing functionality specific to the machine tool controller, such as the Sinumerik automation systems from Siemens, the products of Dr. Johannes Heidenhain GmbH, the automation products of FANUC America, and others. Functions of the library level 202 can be overridden here, in some embodiments, but as this level can be supplied by software development and protected for the users and developers, this will only be rare cases. This level contains specific functions which are unique for a controller type, but they are not specific for a certain machine type.

Optionally, this is followed by the machine level 210 implementing functionality specific to a certain machine. This can be developed, for example, by advanced postprocessor developers or machine tool manufacturers and encrypted against reading through end users.

The kinematics structure of the machine tool model is implemented in the machine tool builder (MTB) layer 206. This can contain information such position, direction and other axis data, e.g. limits, dynamic properties, etc., and other data. This level can be derived from tools such as the NX CAM Machine Tool Builder by Siemens Product Lifecycle Management Software, Inc. (Plano, Tex.).

An original equipment manufacturer (OEM) level 208 can optionally be included. OEM level 208 is similar to the service layer 212 described below, but in this layer all OEM series specific code and settings are defined. Functionality that is the same for a given machine manufacturer can be abstracted here and be reused by sourcing this level.

The main level for adding customer specific functionality is the service layer 212, which can be developed by advanced postprocessor developers and can be protected against reading by end users.

The top level, in various embodiments, is the only level modifiable by end users and is referred to as the customer level 214. In that level, the end customer may adjust the postprocessor according to his needs. This is dependent on the settings of the postprocessor, which functionality is accessible to the user there.

Disclosed embodiments enable built-in support for sharing knowledge and effort. The layer concept allows the re-use of existing technology, protected against wanted and unwanted modifications and without the possibility to copy it illegally, but includes options to override implementations if necessary. This enables existing solutions to be shared with other partners.

Figure 3:
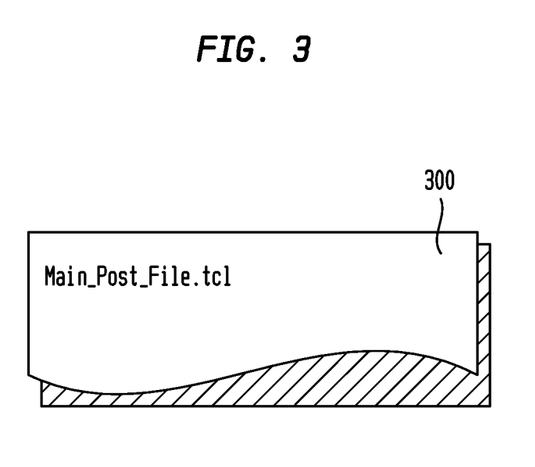
FIG. 3 illustrates an overall structure of other post processors.

FIG. 3 illustrates an overall structure of other post processors. Note that is contains only a single level 300 that is the main post processor file.

FIG. 3 can be contrasted with postprocessor 200 of FIG. 2, which illustrates an overall structure of a post processor as disclosed herein, that can be created with post configurator techniques as disclosed herein.

Instead of having one monolithic postprocessor with all the functionality in it, disclosed embodiments can split the functionality into different layers that are interchangeable and protectable. This gives post developers a better way to reuse existing technology by reusing layers from various sources.

As discussed above, disclosed embodiments can contain multiple layers, each of which can append functionality to the level before. In various embodiments, the first and last layer are fixed (lib and customer), and there can be a flexible number of layers in between these.

In various embodiments, the layers can include:

| | |
|---|---|
| Customer level 214 | This is the layer where all settings a user does in the graphical interface can be saved in a dynamic user interface. |
| Service level 212 | This is the layer where service personnel such as the post developer or end customer do their changes in a script language. Most of the in-depth modifications will be done here. |
| Machine level 210 (optional) | Similar to the service layer, but in this layer all Machine series specific code and settings are defined. Functionality that is the same for a given machine series can be abstracted here and be reused by sourcing this level. |
| OEM level 208 (optional) | Similar to the service layer, but in this layer all OEM series specific code and settings are defined. Functionality that is the same for a given machine manufacturer can be abstracted here and be reused by sourcing this level. |
| MTB level 206 | The information about the kinematic structure is stored here, as well as various other CAM and NC related settings. |
| Controller level 204 (Ctrl) | All machine controller relevant functionality is stored here. |
| Library level 202 (Lib) | All base technology is stored here, that is needed to make the layers work, to handle files and to interact with CAM software and other external tools. |

Figure 4:
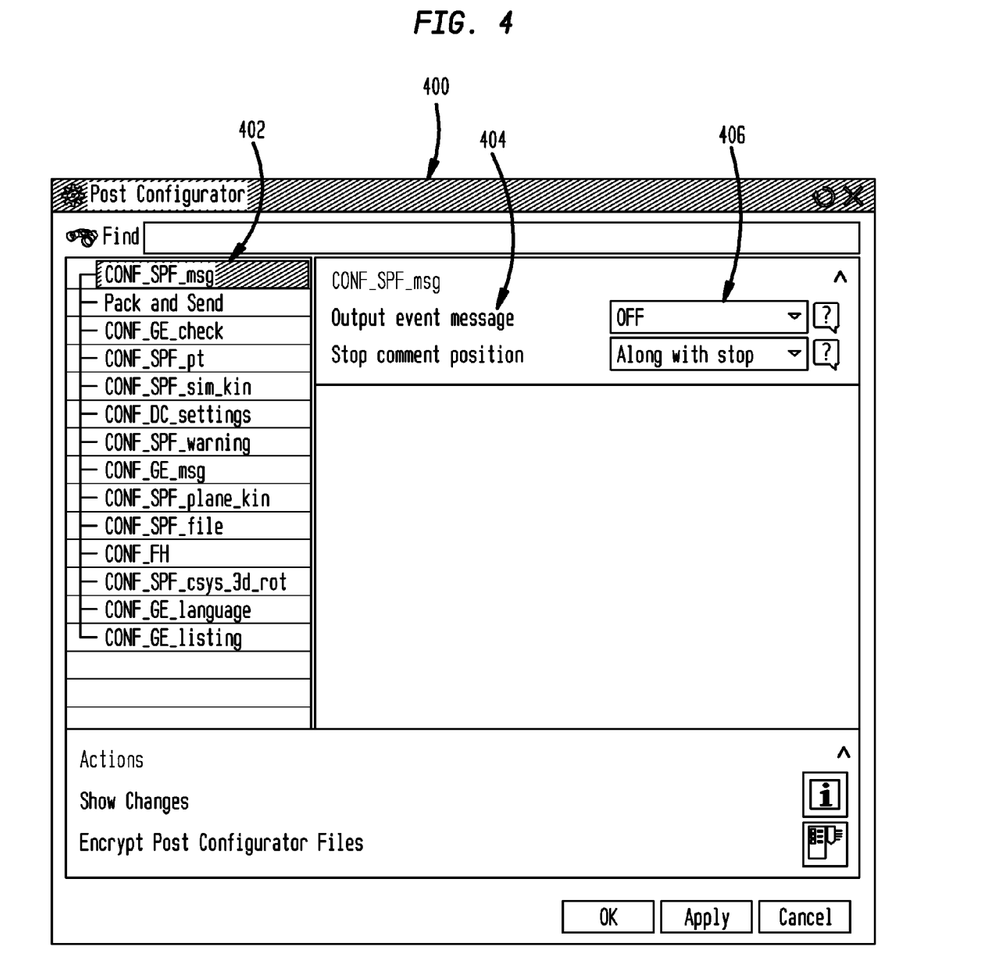
FIG. 4 illustrates a dynamic user interface with objects, properties, and values in accordance with disclosed embodiments.

FIG. 4 illustrates a dynamic user interface 400 with objects 402, properties 404, and values 406 in accordance with disclosed embodiments. A postprocessor as disclosed herein can maintain multiple objects, shown here as objects 402. Each object 402 can have associated properties 404, and each property 404 can have a value 406. In this example, the object CONF_SPF_msg has the property "Output event message" set to a value of "OFF" and the property "Stop comment position" set to the value of "Along with stop". The values for a property can also be referenced as "flags."

For every property item in each layer, the postprocessor author may decide which type of license is necessary to see the value for the property or to do some modifications to it. This allows the developer of each layer to make flags available either to the developer of the next layer or even end customers. For example, a postprocessor author can allow the end user to modify a certain subset of the flags they created in the Service Level. Based on the license, the available flags can be made invisible, read only or read/write.

Configurable postprocessors as disclosed herein enable developers to easily adapt an existing postprocessor or even allow the end users to modify parts of the postprocessor, but only in the defined range which was allowed by the postprocessor developer.

Disclosed embodiments can use an automatic or semi-automatic approach with a self-generating user interface, based on a modified version of original libraries to emphasize to reusability and supportability of "off-the-shelf" post processor components.

It is possible to dynamically define the post processor UI. Each object 402, property 404, and their current value 406 can be made readable or writeable for the UI or completely suppressed by the postprocessor author. This includes objects and properties defined within each level whether it is provided by software development or postprocessor development. End users and less advanced post writers can easily configure the disclosed postprocessors or post configurator while advanced post writers have the full flexibility to introduce their own code and to programmatically make use of existing objects, properties and their access flags.

The following non-limiting code example adds a new object to the user interface:

```
LIB_GE_CREATE_obj New_Object { } {
    LIB_GE_property_ui_name "Sample Object"
    LIB_GE_property_ui_tooltip "Wohhoo"
    set id "New_Property"
        set $id "New_Property"
            set options ($id)        {Option 1|Option 2}
            set datatype ($id)       "STRING"
            set access ($id)         222
            set dialog ($id)         {{New_Property}}
            set descr($id)           {{New_Property}}
}
```

Figure 5:
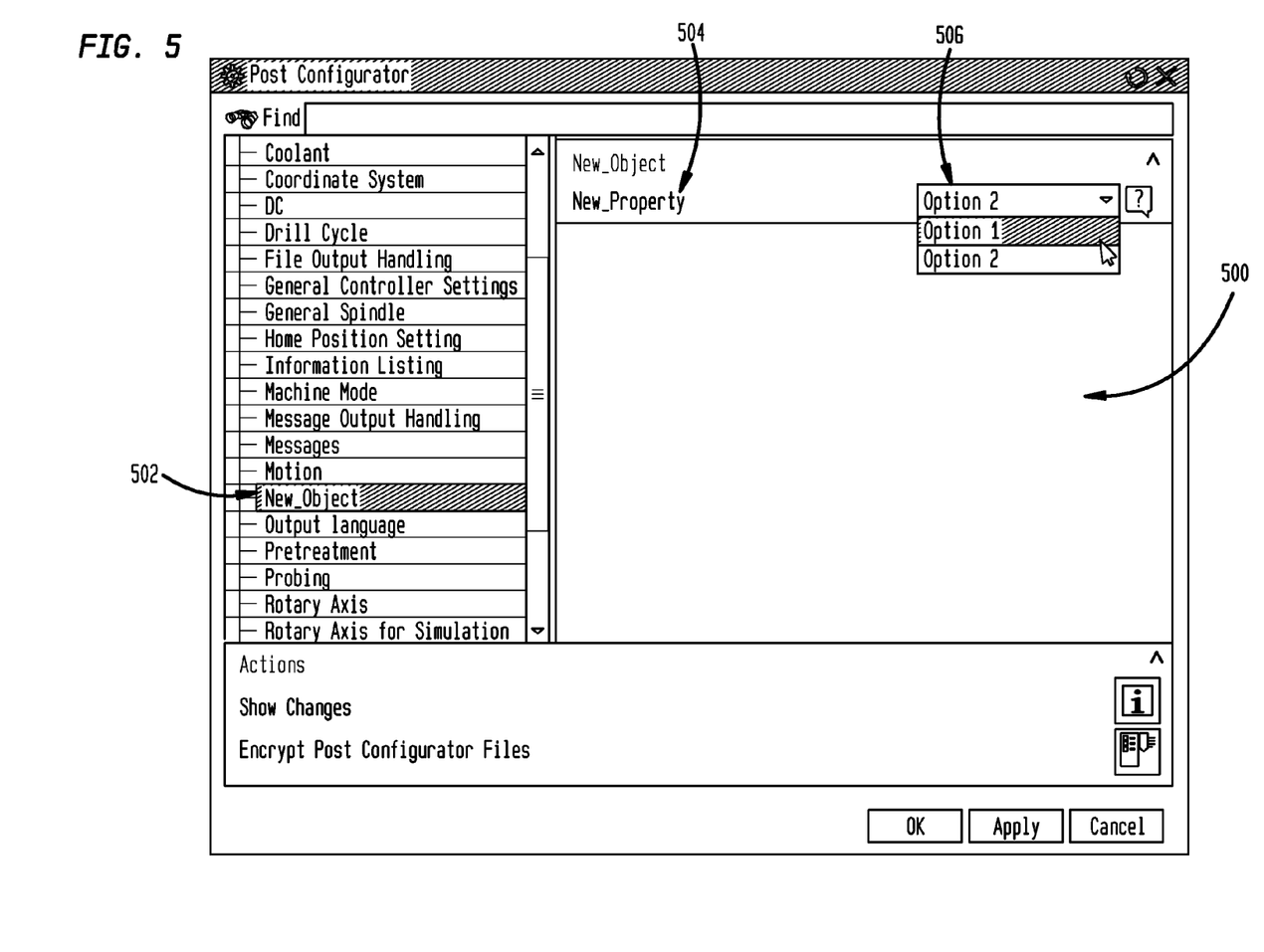
FIG. 5 illustrates an example of a dynamic user interface as disclosed herein, with a new object added.

FIG. 5 illustrates an example of a dynamic user interface 500 as disclosed herein, with a new object 502 added. Object 502, called "New_Object" has an associated property 504 called "New_Property." Property 504 has an associated value 506. In this example, value 506 is presented as a choice of either "Option 1" or "Option 2," presented via a drop-down selection.

Disclosed embodiments give developers means to customize the UI presented to their end customer. There are different object types that can be predefined and documented.

Access levels can be as follows:

| Basic License | Advanced License | Full License |
|---|---|---|
| Read/Write [0-2] | Read/Write [0-2] | Read/Write [0-2] | where 0 indicates no access, 1 indicates read access, and 2 indicates read/write/full access.

For example:

| |
|---|
| Access Level = "012" (Basic: No Access(0) | Advanced: Read Access(1) | Full: Full Access(2)) |
| Access Level = "002" (Basic: No Access(0) | Advanced: No Access(0)     | Full: Full Access(2)) |

Figure 6:
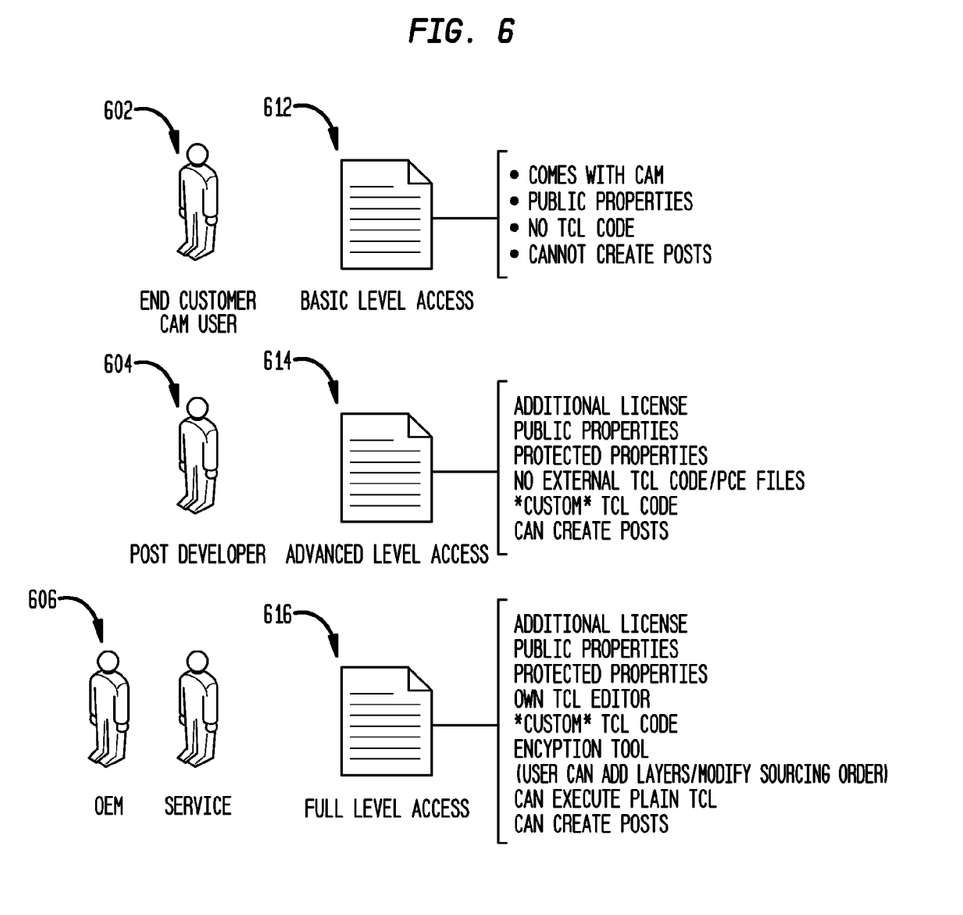
FIG. 6 illustrates a user level definition in accordance with disclosed embodiments.

FIG. 6 illustrates user level definition in accordance with disclosed embodiments. In this example, a basic user 602, such as an end customer or CAM user, has basic level access 612. This level of access, in this example, comes with the CAM system, includes public properties, does not include tool command language (TCL) code, and cannot create post processors.

In this example, an advanced user 604, such as a post processor developer, has advanced level access 614. This level of access, in this example, comes with an additional license, access to public properties, access to protected properties, no external TCL code or configuration files, and the ability to create custom TCL code and post processors.

In this example, a full-access user 606, such as an OEM or service user, has full level access 616. This level of access, in this example, comes with an additional license, access to public properties, access to protected properties, its own TCL editor, the ability to create custom TCL code and post processors, an encryption tool, the ability to execute plain TCL, and the ability add layers or modify the sourcing order.

According to various embodiments, the entire integration of the post configurator libraries with the CAM system can be designed and developed on top of the existing libraries. Disclosed embodiments can include clear separation of functionality on top of base layers: custom, service, machine, OEM, machine tool builder (MTB), as opposed to unstructured or monolithic postprocessors.

Various embodiments include extraction of kinematics and numerically-controlled (NC) related data from a machine tool model, and the dynamic UI disclosed herein. Access codes for objects and properties can be used for three or more different license levels.

Figure 7:
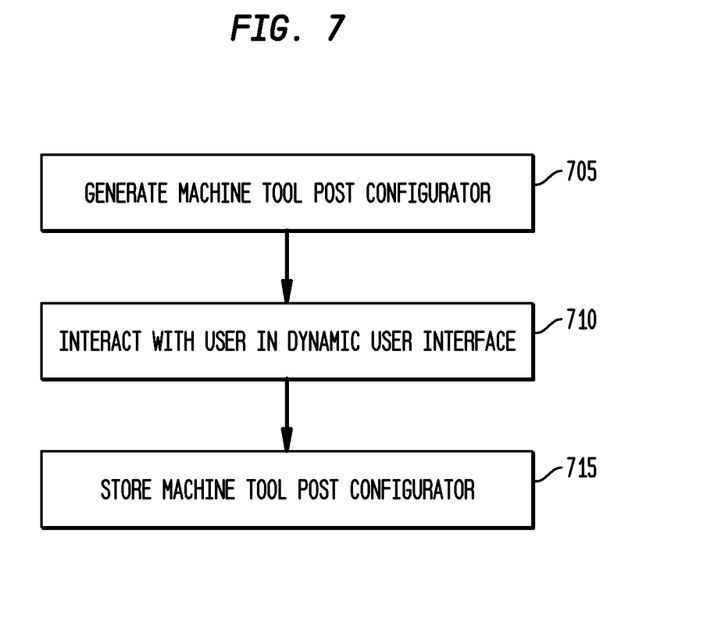
FIG. 7 illustrates a method in accordance with disclosed embodiments.

FIG. 7 illustrates method that can be performed, for example, by one or more data processing systems 100, generically referred to below as the "system."

The system can generate a machine tool post processor having a plurality of levels including a library level, a controller level, and at least one other level (705). The at least one other level can include one or more of a customer level, a service level, a machine level, an OEM level, and a machine tool builder (MTB) level. The plurality of levels can include at least one of a controller level or a library level. Each of the plurality of levels can be associated with an access level defined by properties of the levels.

The system can interact with a user in a dynamic user interface corresponding to the machine tool post processor (710). The dynamic user interface can selectively display the plurality of levels based on corresponding access levels. The dynamic user interface can be dynamically generated from the machine tool post processor. The dynamic user interface can include a plurality of objects, each with associated properties and values.

The system can store the machine tool post processor (715). This can include storing kinematics and NC data.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for machine tool post processor development comprising:
through operation of at least one processor in a data processing system:
generating a machine tool post processor having a plurality of layers including a library level layer, a controller level layer, and at least one other layer, wherein the library level layer stores code to handle files and to interact with computer-aided-manufacturing (CAM) software, wherein the controller level layer stores code associated with machine controller functionality, wherein each layer is associated with at least one of a plurality of different access levels for at least one of a plurality licenses;
interacting with a user in a dynamic user interface based on the machine tool post processor to modify the machine tool post processor, wherein the dynamic user interface provides access to read and write data to each respective layer based on a license associated with each user and the at least one access level associated with the corresponding license associated with each respective layer; and
storing the modified machine tool post processor.

2. The method of claim 1, wherein the at least one other layer includes a customer level layer, a service level layer, and a machine level layer, wherein the customer level layer stores settings that are provided in the dynamic user interface, wherein the service level layer stores script language code corresponding to modifications provided by service personnel, wherein the machine level layer stores machine series specific code and settings.

3. The method of claim 2, wherein the at least one other layer includes an original equipment manufacturer (OEM) level layer and a machine tool builder level layer, wherein the OEM level layer stores OEM series specific code and settings, wherein the machine tool builder level layer stores information regarding kinematic structure and NC data.

4. The method of claim 1, further comprising through operation of the at least one processor extracting kinematics and NC data from a machine tool and storing the kinematics and NC data in the post processor.

5. The method of claim 1, further comprising through operation of the at least one processor dynamically generating the dynamic user interface from the machine tool post processor.

6. A data processing system for machine tool post processor development comprising:
at least one processor; and
an accessible memory, the at least one processor of the data processing system particularly configured to:

generate a machine tool post processor having a plurality of layers including a library level layer, a controller level layer, and at least one other layer, wherein the library level layer stores code to handle files and to interact with computer-aided-manufacturing (CAM) software, wherein the controller level layer stores code associated with machine controller functionality, wherein each layer is associated with at least one of a plurality of different access levels for at least one of a plurality licenses;

interact with a user in a dynamic user interface based on the machine tool post processor to modify the machine tool post processor, wherein the dynamic user interface provides access to read and write data to each respective layer based on a license associated with each user and the at least one access level associated with the corresponding license associated with each respective layer; and store the modified machine tool post processor.

7. The data processing system of claim 6, wherein the at least one other layer includes a customer level layer, a service level layer, and a machine level layer, wherein the customer level layer stores settings that are provided in the dynamic user interface, wherein the service level layer stores script language code corresponding to modifications provided by service personnel, wherein the machine level layer stores machine series specific code and settings.

8. The data processing system of claim 6, wherein the at least one processor of the data processing system extracts kinematics and NC data from a machine tool and stores the kinematics and NC data in the post processor.

9. The data processing system of claim 6, wherein the at least one other layer includes an original equipment manufacturer (OEM) level layer and a machine tool builder level layer, wherein the OEM level layer stores OEM series specific code and settings, wherein the machine tool builder level layer stores information regarding kinematic structure and NC data.

10. The data processing system of claim 6, wherein the at least one processor is configured to dynamically generate the dynamic user interface from the machine tool post processor.

11. A non-transitory computer-readable medium encoded with executable instructions that, when executed by at least one processor, cause the at least one processor to carry out a method for machine tool post processor development comprising:

generate a machine tool post processor having a plurality of layers including a library level layer, a controller level layer, and at least one other layer, wherein the library level layer stores code to handle files and to interact with computer-aided-manufacturing (CAM) software, wherein the controller level layer stores code associated with machine controller functionality, wherein each layer is associated with at least one of a plurality of different access levels for at least one of a plurality licenses;

interact with a user in a dynamic user interface based on the machine tool post processor to modify the machine tool post processor, wherein the dynamic user interface provides access to read and write data to each respective layer based on a license associated with each user and the at least one access level associated with the corresponding license associated with each respective layer; and store the modified machine tool post processor.

12. The computer-readable medium of claim 11, wherein the at least one other layer includes a customer level layer, a service level layer, and a machine level layer, wherein the customer level layer stores settings that are provided in the dynamic user interface, wherein the service level layer stores script language code corresponding to modifications provided by service personnel, wherein the machine level layer stores machine series specific code and settings.

13. The computer-readable medium of claim 11, wherein the method further comprises extracting kinematics and NC data from a machine tool and storing the kinematics and NC data in the post processor.

14. The computer-readable medium of claim 11, wherein the at least one other layer includes an original equipment manufacturer (OEM) level layer and a machine tool builder level layer, wherein the OEM level layer stores OEM series specific code and settings, wherein the machine tool builder level layer stores information regarding kinematic structure and NC data.

* * * * *